(12) United States Patent
Su et al.

(10) Patent No.: US 12,200,724 B2
(45) Date of Patent: Jan. 14, 2025

(54) RESOURCE ALLOCATION METHOD AND DEVICE, AND RESOURCE DETERMINATION METHOD AND DEVICE

(71) Applicant: DATANG MOBILE COMMUNICATIONS EQUIPMENT CO., LTD., Beijing (CN)

(72) Inventors: Xin Su, Beijing (CN); Qiubin Gao, Beijing (CN); Xueyuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 396 days.

(21) Appl. No.: 17/624,549

(22) PCT Filed: May 28, 2020

(86) PCT No.: PCT/CN2020/093029
§ 371 (c)(1),
(2) Date: Jan. 3, 2022

(87) PCT Pub. No.: WO2021/017605
PCT Pub. Date: Feb. 4, 2021

(65) Prior Publication Data
US 2022/0256514 A1 Aug. 11, 2022

(30) Foreign Application Priority Data
Jul. 26, 2019 (CN) .......................... 201910682752.3

(51) Int. Cl.
*H04W 72/23* (2023.01)
*H04L 1/1607* (2023.01)
(Continued)

(52) U.S. Cl.
CPC .......... *H04W 72/23* (2023.01); *H04L 1/1614* (2013.01); *H04W 72/044* (2013.01); *H04W 72/1263* (2013.01)

(58) Field of Classification Search
CPC ............... H04W 72/23; H04W 72/044; H04W 72/1263; H04L 1/1614
(Continued)

(56) References Cited

U.S. PATENT DOCUMENTS 10,708,925 B2 * 7/2020 Sun .................... H04W 72/0446
10,819,390 B2 * 10/2020 Ge ........................ H04L 5/0012
(Continued)

FOREIGN PATENT DOCUMENTS

CN 109076593 A 12/2018
CN 112738889 A * 4/2021 ........... H04L 5/0053
(Continued)

OTHER PUBLICATIONS

MediaTek Inc., "MAC CEs for Beam Management and CSI Acquisition", 3GPP TSG-RAN WG2 Meeting AH-1801 Vancouver, Canada, Jan. 22-26, 2018, total 6 pages, R2-1800653.
(Continued)

*Primary Examiner* — Melvin H Pollack
(74) *Attorney, Agent, or Firm* — Kilpatrick Townsend & Stockton LLP

(57) ABSTRACT

Disclosed in the present application are a resource allocation method and device. The resource allocation method provided in the present application includes: allocating a transmission configuration indication (TCI) state resource and determining TCI state resource allocation information; and notifying a terminal of the TCI state resource allocation information.

10 Claims, 2 Drawing Sheets

--- determining resources of a transmission configuration indication (TCI) state according to TCI state resource allocation information notified by a network side — 201 determining a size of a precoded resource block group (PRG) according to the resources of the TCI state — 202

(51) Int. Cl.
*H04W 72/044* (2023.01)
*H04W 72/1263* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 11,082,984 B2* | 8/2021 | Khoshnevisan | ...... | H04L 5/0035 |
| 11,177,853 B2* | 11/2021 | Zhang | ................ | H04W 72/23 |
| 11,191,083 B2* | 11/2021 | Khoshnevisan | ...... | H04L 5/0041 |
| 11,219,025 B2* | 1/2022 | Chae | ................ | H04L 27/2613 |
| 11,374,712 B2* | 6/2022 | Yum | ................ | H04B 7/0626 |
| 11,553,716 B2* | 12/2022 | Solano Arenas | ..... | H04L 5/0053 |
| 11,553,529 B2* | 1/2023 | Xiong | ................ | H04L 1/1861 |
| 11,575,489 B2* | 2/2023 | Takeda | ................ | H04L 5/0092 |
| 11,576,085 B2* | 2/2023 | Ang | ................ | H04W 36/06 |
| 11,576,142 B2* | 2/2023 | Zhang | ................ | H04W 80/08 |
| 11,595,167 B2* | 2/2023 | Yum | ................ | H04L 5/0048 |
| 11,617,195 B2* | 3/2023 | Huang | ................ | H04L 5/0048 370/329 |
| 11,626,965 B2* | 4/2023 | Takeda | ................ | H04L 5/0098 370/330 |
| 11,632,164 B2* | 4/2023 | Matsumura | ........... | H04L 5/0092 375/262 |
| 11,638,264 B2* | 4/2023 | Miao | ................ | H04W 56/001 370/329 |
| 11,638,283 B2* | 4/2023 | Yoshimura | ........ | H04W 72/1273 370/329 |
| 11,646,853 B2* | 5/2023 | Takeda | ................ | H04L 5/0041 370/329 |
| 11,696,325 B2* | 7/2023 | Zhang | ............... | H04W 72/0446 370/329 |
| 11,700,607 B2* | 7/2023 | Matsumura | ......... | H04L 27/2678 370/329 |
| 11,705,984 B2* | 7/2023 | Lin | ................ | H04L 5/0051 370/329 |
| 11,706,007 B2* | 7/2023 | Yokomakura | ......... | H04L 5/0053 370/329 |
| 11,706,777 B2* | 7/2023 | Liu | ................ | H04W 72/23 370/329 |
| 11,722,260 B2* | 8/2023 | Baldemair | ........... | H04B 7/0456 370/329 |
| 11,723,049 B2* | 8/2023 | Xi | ................ | H04L 5/0094 370/329 |
| 11,737,081 B2* | 8/2023 | Moon | ................ | H04L 1/0038 370/329 |
| 11,743,879 B2* | 8/2023 | Kwon | ................ | H04L 5/0096 370/329 |
| 11,765,660 B2* | 9/2023 | Kim | ................ | H04W 52/0261 370/318 |
| 11,765,720 B2* | 9/2023 | Lee | ................ | H04L 5/005 370/329 |
| 11,770,870 B2* | 9/2023 | Venugopal | ............ | H04B 7/088 370/330 |
| 11,792,751 B2* | 10/2023 | Harada | ................ | H04L 5/0048 370/329 |
| 11,838,239 B2* | 12/2023 | Bae | ................ | H04L 5/0053 |
| 11,838,946 B2* | 12/2023 | Hakola | ............ | H04W 74/0808 |
| 11,844,147 B2* | 12/2023 | Noh | ................ | H04L 5/0092 |
| 11,909,526 B2* | 2/2024 | Yuan | ................ | H04B 7/022 |
| 11,910,417 B2* | 2/2024 | Liu | ................ | H04W 72/53 |
| 11,930,518 B2* | 3/2024 | Matsumura | ........... | H04L 5/0092 |
| 2018/0324760 A1 | 11/2018 | Yuk et al. | | |
| 2020/0221428 A1 | 7/2020 | Moon et al. | | |
| 2022/0167329 A1* | 5/2022 | Laddu | .................. | H04L 1/0025 |

FOREIGN PATENT DOCUMENTS

| | | | | |
|---|---|---|---|---|
| CN | 114651417 A | * | 6/2022 | .......... H04L 5/0005 |
| CN | 114667790 A | * | 6/2022 | |
| CN | 115623509 A | * | 1/2023 | |
| EP | 3780806 A1 | | 2/2021 | |
| GB | 2596667 A | * | 1/2022 | .......... H04L 5/0035 |
| MX | 2018014381 A | | 5/2019 | |
| TW | 201907680 A | | 2/2019 | |
| WO | 2018217063 A1 | | 11/2018 | |
| WO | 2019031850 A1 | | 2/2019 | |
| WO | 2019091135 A1 | | 5/2019 | |
| WO | WO-2020191740 A1 | * | 10/2020 | .......... H04B 7/0413 |
| WO | WO-2021062830 A1 | * | 4/2021 | |
| WO | WO-2021066622 A1 | * | 4/2021 | .......... H04L 5/0016 |

OTHER PUBLICATIONS

Qualcomm Incorporated, "Multi-TRP Enhancements", 3GPP TSG-RAN WG1 Meeting #97, May 13-17, 2019 Reno, Nevada, USA, total 25 pages, R1-1907289.

InterDigital Inc.,"PRG Size Indication in NR", 3GPP TSG RAN WG1 Meeting #89, Hangzhou, China, May 15-19, 2017, total 3 pages, R1-1708332.

ZTE, "Enhancements on Multi-TRP and Multi-panel Transmission", 3GPP TSG RAN WG1 #96bis, Xi'an, China, Apr. 8-12, 2019, total 13 pages, R1-1904013.

Ericsson, "Feature lead summary 1 of beam measurement and reporting", 3GPP TSG RAN WG1 Meeting AH 1801, Vancouver, Canada, Jan. 22-26, 2018, total 12 pages, R1-1801006.

Nokia et al., "On PDCCH Enhancements for NR URLLC", 3GPP TSG RAN WG1#97, Reno, Nevada, US, May 13-17, 2019, total 17 pages, R1-1906751.

Vivo, "Discussion on multi-DCI-based URLLC transmission", 3GPP TSG RAN WG1 #97, Reno, USA, May 13-17, 2019, total 4 pages, R1-1906168.

* cited by examiner

RESOURCE ALLOCATION METHOD AND DEVICE, AND RESOURCE DETERMINATION METHOD AND DEVICE

CROSS REFERENCE TO RELATED APPLICATIONS

This application is a national phase entry under 35 U.S.C. § 371 of International Application No. PCT/CN2020/093029, filed on May 28, 2020, which claims priority to Chinese Patent Application No. 201910682752.3, filed to the China National Intellectual Property Administration on Jul. 26, 2019 and entitled "RESOURCE ALLOCATION METHOD AND DEVICE, AND RESOURCE DETERMINATION METHOD AND DEVICE", the entire contents of which are incorporated herein by reference.

FIELD

The present application relates to the field of communications, in particular to a resource allocation method and apparatus, and a resource determination method and apparatus.

BACKGROUND

A Multi Transmission Reception Point (Multi-TRP)/Panel Transmission Technology:

in order to improve the coverage at the edge of a cell and provide more balanced quality of service within a service region, multipoint coordination is still an important means in an NR system. From the perspective of network morphology, network deployment with a large quantity of distributed access points and baseband centralized processing will be more conducive to providing a balanced user experience rate, and significantly reducing the delay and signaling overheads caused by handover. With the increase of frequency bands, from the perspective of ensuring network coverage, relatively dense deployment of access points is also required. In a high frequency band, as the integration of an active antenna device increases, it will be more inclined to adopt modular active antenna arrays. An antenna array of each TRP can be divided into relatively independent antenna panels, so the shape and number of ports of an entire front can be flexibly adjusted according to deployment scenarios. The antenna panels or TRPs can also be connected by optical fibers for more flexible distributed deployment. In a millimeter wave band, as a wavelength decreases, a blocking effect produced by obstacles such as human bodies or vehicles will become more significant. In this case, from the perspective of ensuring the robustness of link connection, cooperation between the TRPs or panels can also be used to transmit/receive beams from angles, to reduce negative effects of the blocking effect.

An ultra-reliable and low latency communications (URLLC) enhanced solution based on coordinated multipoint transmission: in the related art, URLLC enhanced solutions based on coordinated multipoint transmission that may be adopted include the following solutions:

Solution 1 (space division multiplexing (SDM)): on resources of overlapping time-frequency in a slot, each transmission occasion (actually referring to a signal sent by a TRP on a resource) corresponds to an associated transmission configuration indication (TCI) state and a group of data layers of a group of demodulation reference signal (DMRS) ports.
  Solution 2 (frequency division multiplexing (FDM)): in a slot, each frequency domain resource is associated with one TCI state, and the frequency domain resources do not overlap each other.
  Solution 3 (time division multiplexing (TDM) at a mini-slot level): in a slot, each time domain resource is associated with one TCI state, and the time domain resources do not overlap each other. One time domain resource refers to a group of mini slots (there may be only one mini slot in each group).
  Solution 4 (TDM at a slot level): each time domain resource is associated with one TCI state, and the time domain resources do not overlap each other. One time domain resource refers to a group of slots (there may be only one slot in each group).

The above manners may also be further combined, such as FDM+TDM.

Physical Resource Block (PRB) Bundling:

For transmission based on a transparent demodulation reference signal (DMRS), the DMRS and data adopt the same precoding manner. In this case, there is a contradiction between the performance of frequency selective precoding and the accuracy of channel estimation. In order to obtain performance gain of joint channel estimation of physical resource blocks (PRB), the granularity of frequency selective precoding may be limited, to reduce a gain of precoding. Conversely, if each PRB is independently pre-coded in order to ensure the gain of frequency selective precoding, joint channel estimation cannot be performed.

In view of the above problems, LTE adopts the following different solutions for frequency division duplex (FDD) and time division duplex (TDD) systems.

For a system configured with a precoding matrix indicator (PMI) feedback, since the PMI/rank indicator (RI) is only rough quantization of a channel, the performance gain of frequency selective precoding is not obvious. However, joint channel estimation can directly improve channel estimation performance and improve link reception quality. Therefore, a PRB bundling manner is adopted for the frequency division duplex (FDD) system, that is, UE can assume that precoding of a PDSCH remains unchanged on continuous PRBs. The specific PRB bundling size depends on a system bandwidth, as shown in Table 1 below.

TABLE 1

| bundling size of an LTE system | |
| --- | --- |
| System Bandwidth (#PRB) | PRG size (PRB) |
| ≤10 | 1 |
| 11-26 | 2 |
| 27-63 | 3 |
| 64-110 | 2 |

For a system configured with non-precoding matrix indicator (non-PMI) feedback, a base station (eNB) may use channel reciprocity to obtain more accurate channel state information. Therefore, compared with the FDD system, frequency selective precoding has more important significance for link performance. In this case, joint precoding of the PRBs to support joint channel estimation between the PRBs will not be able to compensate for the resulting loss of the gain of precoding. Based on the above considerations, PRB bundling is not applicable when the non-PMI feedback is configured. At this moment, the UE assumes that each scheduled PRB uses an independent precoding manner, so joint channel estimation cannot be performed.

In unicast transmission of a new radio (NR) system, in order to optimize transmission for different system bandwidths, a bundling manner supporting a dynamic precoding resource block group (PRG) composed of continuous PRBs is adopted. The specific solution is as follows:

if radio resource control (RRC) turns off a dynamic indication function, a PRG size configured by a high layer, namely, the quantity of the PRBs included, is used;

in addition, for back-off transmission, a default PRG size (2PRB) is also used;

if RRC enables the dynamic indication function, a PRG size (selected from 2, 4, and a continuously scheduled bandwidth) is configured by the RRC, and the specific PRG size is determined through downlink control signaling (DCI format 1_1).

In order to maintain sufficient flexibility, the RRC can configure two parameter sets:

set 1 contains one or two PRG size parameter values. When including one value, the set 1 may be configured as 2 or 4 or the continuously scheduled bandwidth. When including two values, the set 1 may be configured as {2, the continuously scheduled bandwidth} or {4, the continuously scheduled bandwidth}.

set 2 contains only one value, and may be configured as 2 or 4 or the continuously scheduled bandwidth.

When an indication field of the PRG size in the DCI is set to be 1, the adopted PRG size is selected from the set 1. If the set 1 contains two PRG sizes: if the quantity of scheduled PRBs exceeds half of a BWP, the PRG size is the continuously scheduled bandwidth; otherwise, the PRG size is 2 or 4.

When the indication field of the PRG size in the DCI is set to be 0, the PRG size in the set 2 is used.

If the PRG size is the "continuously scheduled bandwidth", non-continuous frequency domain resources cannot be allocated for a terminal.

In summary, there is currently no clear resource allocation manner in the multi-TRP/panel-based URLLC enhanced transmission solution. For Solution 2 (the FDM manner) above, if resource allocation does not consider bundling, the channel estimation performance may be influenced, and finally the reception and detection performance may be influenced.

SUMMARY

Embodiments of the present application provide a resource allocation method and apparatus and a resource determination method and apparatus.

On a network side, a resource allocation method provided by the embodiments of the present application includes:

allocating resources of a transmission configuration indication (TCI) state and determining TCI state resource allocation information; and notifying a terminal of the TCI state resource allocation information.

In one embodiment, the terminal is notified of the TCI state resource allocation information in one of the following manners:

Manner 1: notifying the terminal of the TCI state resource allocation information through a bitmap; or Manner 2: notifying a starting resource block RB and a quantity of occupied RBs of the TCI state; or Manner 3: notifying a correspondence relationship between the TCI state and a preset resource allocation pattern.

In one embodiment, Manner 1 includes:

with a resource block group (RBG) as a unit, numbering RBGs according to an RBG grid, and indicating the TCI state resource allocation information through the bitmap.

In one embodiment, the indicating the TCI state resource allocation information through the bitmap includes:

notifying resources corresponding to TCI states in downlink control information, and then notifying resources corresponding to one of the TCI states through the bitmap;

notifying resources corresponding to each of TCI states respectively in the downlink control information through the bitmap.

In one embodiment, Manner 2 includes:

notifying resources corresponding to TCI states in downlink control information, and then notifying a starting RB and the quantity of occupied RBs of one of the TCI states;

notifying a starting RB and a quantity of occupied RBs corresponding to each of TCI states respectively in downlink control information.

In one embodiment, when Manner 3 is adopted, the preset resource allocation pattern includes one of the following:

odd-numbered RBGs or RBs are a group of resources, and even-numbered RBGs or RBs are another group of resources; or at least first one RBG or RB is a group of resources, and the other RBGs or RBs are another group of resources; or a bitmap of at least one RBG or RB.

Correspondingly, on a terminal side, a resource determination method provided by the embodiments of the present application includes:

determining resources of a transmission configuration indication (TCI) state according to TCI state resource allocation information notified by a network side; and determining a size of a pre-coded resource block group (PRG) according to the resources of the TCI state.

In one embodiment, the size of the PRG is determined in the following manners:

when downlink control information sent by the network side indicates that a value of the size of the PRG is taken from set 1, and the set 1 is {2, a continuously scheduled bandwidth} or {4, the continuously scheduled bandwidth}:

for any TCI state:

if resources corresponding to the any TCI state are continuous and greater than or equal to BWP/4, or, resources corresponding to the any TCI state are continuous, and a sum of sizes of resources corresponding to TCI states exceeds BWP/2, the size of the PRG is a size of the resources corresponding to the any TCI state, BWP is a preset part of a bandwidth;

otherwise, the size of the PRG is a value other than "the continuously scheduled bandwidth" in the set 1.

In one embodiment, a precoding manner in resources with the size of the PRG is kept unchanged.

On a network side, a resource allocation apparatus provided by an embodiment of the present application includes:

a memory, configured to store a program instruction; and a processor, configured to call the program instruction stored in the memory, and execute, according to an obtained program:

allocating resources of a transmission configuration indication (TCI) state, and determining TCI state resource allocation information; and notifying a terminal of the TCI state resource allocation information.

In one embodiment, the processor notifies the terminal of the TCI state resource allocation information in one of the following manners:

Manner 1: notifying the terminal of the TCI state resource allocation information through a bitmap; or Manner 2: notifying a starting resource block RB and a quantity of occupied RBs of the TCI state; or Manner 3: notifying a correspondence relationship between the TCI state and a preset resource allocation pattern.

In one embodiment, when the terminal is notified of the TCI state resource allocation information in the Manner 1, the processor is configured to:

with a resource block group (RBG) as a unit, number RBGs according to an RBG grid, and indicate the TCI state resource allocation information through the bitmap.

In one embodiment, the processor is configured to:

notify resources corresponding to TCI states in downlink control information, and then notify resources corresponding to one of the TCI states through the bitmap;

notify the resources corresponding to each of TCI states respectively in the downlink control information through the bitmap.

In one embodiment, when the terminal is notified of the TCI state resource allocation information in the Manner 2, the processor is configured to:

notify resources corresponding to TCI states in downlink control information, and then notify a starting RB and a quantity of occupied RBs of one of the TCI states;

notify a starting RB and a quantity of occupied RBs corresponding to each TCI state respectively in downlink control information.

In one embodiment, when the Manner 3 is adopted, the preset resource allocation pattern includes one of the following:

odd-numbered RBGs or RBs are a group of resources, and even-numbered RBGs or RBs are another group of resources; or at least first one RBG or RB is a group of resources, and the other RBGs or RBs are another group of resources; or a bitmap of at least one RBG or RB.

On a terminal side, a resource determination apparatus provided by the embodiments of the present application includes:

a memory, configured to store a program instruction; and a processor, configured to call the program instruction stored in the memory, and execute, according to an obtained program:

determining resources of a transmission configuration indication (TCI) state according to TCI state resource allocation information notified by a network side; and determining a size of a pre-coded resource block group (PRG) according to the resources of TCI state.

In one embodiment, the processor determines the size of the pre-coded resource block group (PRG) in the following manners:

when downlink control information sent by the network side indicates that a value of the size of the PRG is taken from set 1, and the set 1 is {2, a continuously scheduled bandwidth} or {4, the continuously scheduled bandwidth}:

for any TCI state:

if resources corresponding to the any TCI state are continuous and greater than or equal to BWP/4, or, resources corresponding to the any TCI state are continuous, and a sum of sizes of resources corresponding to TCI states exceeds BWP/2, the size of the PRG is a size of the resource corresponding to the any TCI state, and BWP is a preset part of a bandwidth;

otherwise, the size of the PRG is a value other than "the continuously scheduled bandwidth" in the set 1.

In one embodiment, a precoding manner in the resources with the size of the PRG is kept unchanged.

On a network side, another resource allocation apparatus provided by the embodiments of the present application includes:

a determination device, configured to allocate resources of a transmission configuration indication (TCI) state and determine TCI state resource allocation information; and an allocation device, configured to notify a terminal of the TCI state resource allocation information.

In one embodiment, the allocation device notifies the terminal of the TCI state resource allocation information in one of the following manners:

Manner 1: notifying the terminal of the TCI state resource allocation information through a bitmap; or Manner 2: notifying a starting resource block RB and a quantity of occupied RBs of the TCI state; or Manner 3: notifying a correspondence relationship between the TCI state and a preset resource allocation pattern.

In one embodiment, when the terminal is notified of the TCI state resource allocation information in the Manner 1, the allocation device is configured to:

with a resource block group (RBG) as a unit, number RBGs according to an RBG grid, and indicate the TCI state resource allocation information through the bitmap.

In one embodiment, the allocation device is configured to:

notify resources corresponding to TCI states in downlink control information, and then notify resources corresponding to one of the TCI states through the bitmap;

notify resources corresponding to each of the TCI states respectively in the downlink control information through the bitmap.

In one embodiment, when the terminal is notified of the TCI state resource allocation information in the Manner 2, the allocation device is configured to:

notify resources corresponding to TCI states in downlink control information, and then notify a starting RB and a quantity of occupied RBs of one of the TCI states;

notify a starting RB and a quantity of occupied RBs corresponding to each of TCI states respectively in the downlink control information.

In one embodiment, when Manner 3 is adopted, the preset resource allocation pattern includes one of the following:

odd-numbered RBGs or RBs are a group of resources, and even-numbered RBGs or RBs are another group of resources; or at least first one RBG or RB is a group of resources, and the other RBGs or RBs are another group of resources; or a bitmap of at least one RBG or RB.

On a terminal side, another resource determination apparatus provided by the embodiments of the present application includes:
- a first device, configured to determine resources of a transmission configuration indication (TCI) state according to TCI state resource allocation information notified by a network side; and
- a second device, configured to determine a size of a pre-coded resource block group (PRG) according to the resource of the TCI state.

In one embodiment, the second device determines the size of the pre-coded resource block group (PRG) in the following manners:
- when downlink control information sent by the network side indicates that a value of the size of the PRG is taken from set 1, and the set 1 is {2, a continuously scheduled bandwidth} or {4, the continuously scheduled bandwidth}:
  - for any TCI state:
    - if resources corresponding to the any TCI state is continuous and greater than or equal to BWP/4, or, resources corresponding to the any TCI state is continuous, and a sum of sizes of resources corresponding to TCI states exceeds BWP/2, the size of the PRG size is a size of the resource corresponding to the any TCI state, BWP is a preset part of a bandwidth;
    - otherwise, the size of the PRG is a value other than "the continuously scheduled bandwidth" in the set 1.

In one embodiment, a precoding manner in the resources with the sized of the PRG is kept unchanged.

Another embodiment of the present application provides a computing device, including a memory and a processor. The memory is configured to store a program instruction. The processor is configured to call the program instruction stored in the memory, and execute, according to an obtained program, any one of the resource allocation method or the resource determination method.

Another embodiment of the present application provides a computer storage medium, storing a computer-executable instruction. The computer-executable instruction is configured to make a computer execute any one of the resource allocation method or the resource determination method.

BRIEF DESCRIPTION OF THE DRAWINGS

In order to more clearly illustrate the embodiments of the present application, a brief description will be given below with reference to the drawings needing to be used in the description of the embodiments.

DETAILED DESCRIPTION OF THE EMBODIMENTS

Figure 1:
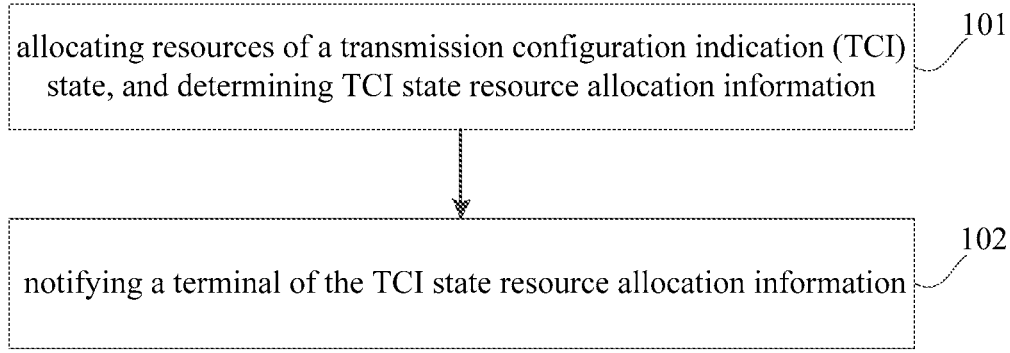
FIG. 1 is a schematic flowchart of a resource allocation method on a network side according to an embodiment of the present application.

The following will clearly and completely describe the embodiments of the present application in conjunction with the drawings in the embodiments The described embodiments are only a part of the embodiments of the present application, not all embodiments. Based on the embodiments of the present application, all other embodiments shall fall within the protection scope of the present application.

Embodiments of the present application provide a resource allocation method and apparatus and a resource determination method and apparatus, for use in implementing resource allocation in a multi-TPR/panel-based URLLC enhanced transmission solution.

The methods and the apparatuses are based on the same application concept. Since the methods and the apparatuses have similar principles for solving problems, implementations of the apparatuses and implementations of the methods may be referred to each other, and the overlaps will not be repeated.

The embodiments of the present application may be applicable to various systems, especially a 5G system. For example, the applicable systems may be a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) system, a 5G system, a 5G NR system, etc. The various systems each include a terminal device and a network device.

The terminal device involved in the embodiments of the present application may be referred to equipment that provides voice and/or data connectivity for users, handheld equipment with a wireless connection function, or other processing equipment connected to a wireless modem. In different systems, names of the terminal device may also be different. For example, in the 5G system, the terminal device may be referred to as user equipment (UE). Wireless terminal device may communicate with one or more core networks via a RAN. The wireless terminal device may be mobile terminal device, such as a mobile phone (or referred to as a "cellular" phone) and a computer with the mobile terminal device, for example, it may be portable, pocket, handheld, computer built-in or vehicle-mounted mobile devices that exchange language and/or data with a wireless access network. For example, personal communication service (PCS) phones, cordless phones, session initiated protocol (SIP) phones, wireless local loop (WLL) stations, personal digital assistants (PDA) and other equipment. The wireless terminal device may also be referred to as a system, a subscriber device, a subscriber station, a mobile station, a mobile, a remote station, an access point, a remote terminal, an access terminal, a user terminal, a user agent, and a user device, which is not limited in the embodiments of the present application.

The network device involved in the embodiments of the present application may be a base station, and the base station may include cells. Depending on specific application scenarios, the base station may also be referred to as an access point, or may refer to equipment that communicates with the wireless terminal device through one or more sectors on an air interface in an access network, or other names. The network device may be configured to convert a received air frame and Internet protocol (IP) packets to each other as a router between the wireless terminal device and the rest of the access network, and the rest of the access network may include an Internet protocol (IP) communication network. The network device may also coordinate the attribute management of the air interface. For example, the network device involved in the embodiments of the present application may be network device (base transceiver station, BTS) in the global system for mobile communications (GSM) or the code division multiple access (CDMA) system, or network device (NodeB) in the wide-band code division multiple access (WCDMA) system, or evolved network device (evolutional node B, eNB or e-NodeB) in the long term evolution (LTE) system, a 5G base station in a 5G network architecture (next generation system), or a home evolved node B (HeNB), a relay node, a femto base station, a pico base station), etc., which is not limited in the embodiments of the present application.

The embodiments of the present application will be described in detail below with reference to the accompanying drawings of the specification. It should be noted that the display order of the embodiments of the present application only represents the sequence of the embodiments, and does not represent the pros and cons of the embodiments.

In the embodiments of the present application, with regard to resource allocation, any of the following manners may be adopted.

Manner 1—bitmap indication: with a resource block group (RBG) as a unit, RBGs are numbered according to an RBG grid, and resource allocation is indicated through a bitmap. The specific manner may be any of the following:

in downlink control information, overall resource allocation, namely all resources corresponding to transmission configuration indication states (TCI states), is notified, and then, resources corresponding to one of the TCI states is notified (with the RBG as a device, the RBGs are numbered according to the RBG grid, and the resource allocation is indicated through the bitmap), for example, by default, only resources corresponding to TCI state 0 is notified, and another TCI state corresponds to remaining resources;

in the downlink control information, resources corresponding to each of TCI states are notified respectively (with the RBG as a device, the RBGs are numbered according to the RBG grid, and the resource allocation is indicated through the bitmap).

Manner 2—starting RB+length indication: resource blocks (RB) are taken as a device. The specific manner may be any of the following:

in downlink control information, overall resource allocation, namely all resources corresponding to TCI states, is notified, and then resources corresponding to one of the TCI states is notified (a starting RB and the quantity of occupied RBs are notified), for example, by default, only resources corresponding to TCI state 0 is notified, and another TCI state corresponds to remaining resources; and in the downlink control information, the resources corresponding to each of TCI states are notified respectively (the starting RB and the quantity of the occupied RBs are notified).

Manner 3—a predefined pattern+indication (such as odd-numbered and even-numbered RBGs/RBs, up and down, an RBG/RB bitmap).

Resource allocation patterns are predefined, for example:
  odd-numbered RBGs or RBs are a group, and even-numbered RBGs or RBs are a group;
  first X RBGs or RBs are a group, and remaining RBGs or RBs are a group; and
  a bitmap of RBGs or RBs.

Specific resource allocation may be implemented in the following manners.

Manner 3-1: in downlink control information, overall resource allocation, namely all resources corresponding to TCI states, is notified. There is a pre-agreed relationship between each TCI state and resource allocation pattern, for example:
  TCI state 0 corresponds to even-numbered RBGs or RBs in the allocated resources, and TCI state 1 corresponds to the remaining RBGs or RBs in the allocated resources;
  TCI state 0 corresponds to first X RBGs or RBs in the allocated resources, and TCI state 1 corresponds to the remaining RBGs or RBs in the allocated resources, X is an integer greater than or equal to zero; and
  TCI state 0 corresponds to resources indicated by bitmap 0 in the allocated resources, and TCI state 1 corresponds to the remaining resources in the allocated resources.

Manner 3-2: the correspondence relationship between each of TCI states and the resource allocation pattern is notified in the downlink control information. For example:
  TCI state 0/1 corresponds to even-numbered RBGs or RBs in the allocated resources, and TCI state I/O corresponds to odd-numbered RBGs or RBs in the allocated resources;
  TCI state 0/1 corresponds to the first X RBGs or RBs in the allocated resources, and TCI state I/O corresponds to the remaining RBGs or RBs in the allocated resources; and
  TCI state 0/1 corresponds to the resources indicated by bitmap 0 in the allocated resources, and TCI state I/O corresponds to the remaining resources in the allocated resources.

In the embodiments of the present application, determination of the size of the PRG is as follows:
  if the downlink control information indicates that the value of the size of the PRG is taken from parameter set 1, and the set 1 is {2, a continuously scheduled bandwidth} or {4, the continuously scheduled bandwidth}, the specific PRG size needs to be determined according to the following process:
  for any TCI state:
  when resources corresponding to the any TCI state is continuous and greater than or equal to BWP/4 (or when a sum of sizes of resources corresponding to TCI states exceeds BWP/2), then the size of the PRG corresponding to the TCI state is equal to a size of the resources corresponding to the TCI state, and Bandwidth Part (BWP), namely a part of a bandwidth;
  on the contrary, the size of the PRG is a value other than the "continuously scheduled bandwidth" in the set 1, for example, if the set 1 is configured to contain two values, the set 1 may be configured as {2, the continuously scheduled bandwidth} or {4, the continuously scheduled bandwidth}, so the value other than the "continuously scheduled bandwidth" is 2 or 4.

With regard to the parameter sets, RRC may configure two parameter sets:
- set 1 contains one or two PRG size parameter values. When including one value, set 1 may be configured as 2 or 4 or the continuously scheduled bandwidth. When including two values, the set 1 may be configured as {2, the continuously scheduled bandwidth} or {4, the continuously scheduled bandwidth}.
- set 2 contains only one value, and may be configured as 2 or 4 or the continuously scheduled bandwidth.

In summary, on a network side, referring to FIG. 1, a resource allocation method provided by an embodiment of the present application includes:
S101, allocating resources of a transmission configuration indication (TCI) state, and determining TCI state resource allocation information; and
S102, notifying a terminal of the TCI state resource allocation information.

In one embodiment, the terminal is notified of the TCI state resource allocation information in one of the following manners:
Manner 1: the terminal is notified of the TCI state resource allocation information through a bitmap; or
Manner 2: a starting resource block (RB) and a quantity of occupied RBs of the TCI state are notified; or
Manner 3: a correspondence relationship between the TCI state and a preset resource allocation pattern is notified.

In one embodiment, the Manner 1 includes:
With a resource block group (RBG) as a unit, the RBGs are numbered according to an RBG grid, and the TCI state resource allocation information is indicated through the bitmap.

In one embodiment, the indicating the TCI state resource allocation information through the bitmap includes:
resources corresponding to TCI states are notified in downlink control information, and then a resource corresponding to one of the TCI states is notified through the bitmap;
the resources corresponding to each of TCI states is notified respectively in downlink control information through the bitmap.

In one embodiment, the Manner 2 includes:
resources corresponding to TCI states are notified in downlink control information, and then a starting RB and a quantity of occupied RBs of one of the TCI states are notified;
a starting RB and a quantity of occupied RBs corresponding to each of TCI states are notified respectively in downlink control information.

In one embodiment, when the Manner 3 is adopted, the preset resource allocation pattern includes one of the following:
odd-numbered RBGs or RBs are a group of resources, and even-numbered RBGs or RBs are another group of resources; or
at least first one RBG or RB is a group of resources, and the other RBGs or RBs are another group of resources; or
a bitmap of at least one RBG or RB.

Figure 2:
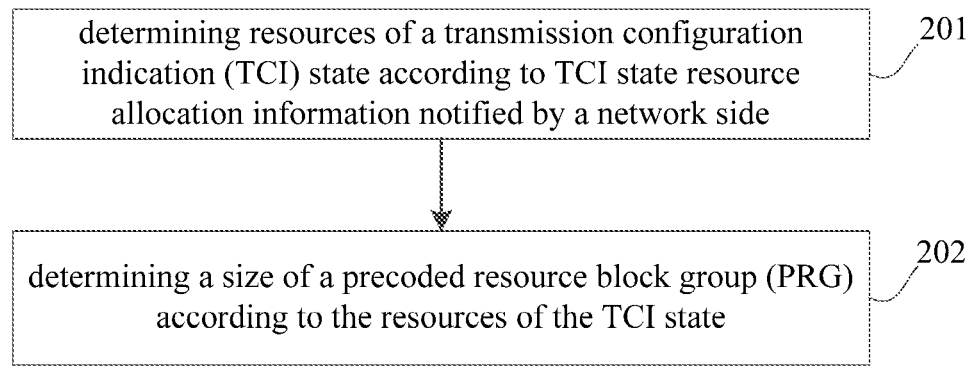
FIG. 2 is a schematic flowchart of a resource determination method on a terminal side according to an embodiment of the present application.

Correspondingly, on a terminal side, referring to FIG. 2, a resource determination method provided by the embodiments of the present application includes:
S201, determining resources of a transmission configuration indication (TCI) state according to TCI state resource allocation information notified by a network side; and S202, determining a size of a pre-coded resource block group (PRG) according to the resources of the TCI state.

In one embodiment, the size of the PRG is determined in the following manners:
when downlink control information sent by the network side indicates that a value of the size of the PRG is taken from set 1, and the set 1 is {2, a continuously scheduled bandwidth} or {4, the continuously scheduled bandwidth}:
for any TCI state: if resources corresponding to the any TCI state are continuous and greater than or equal to BWP/4, or, resources corresponding to the any TCI state are continuous, and a sum of sizes of resources corresponding to TCI states exceeds BWP/2, the size of the PRG is a size of the resource corresponding to the any TCI state, BWP is a preset part of a bandwidth;
otherwise, the size of the PRG is a value other than "the continuously scheduled bandwidth" in the set 1.

In one embodiment, a precoding manner in the resources with the size of the PRG is kept unchanged.

Figure 3:
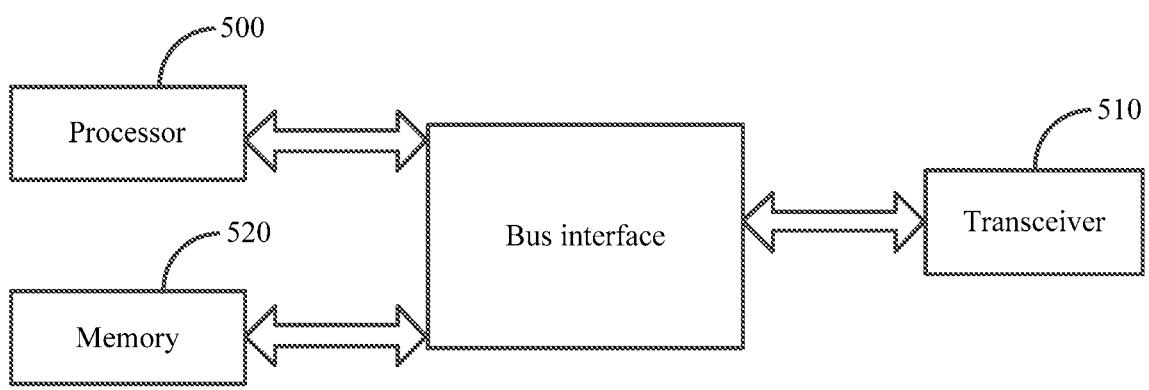
FIG. 3 is a schematic structural diagram of a resource allocation apparatus on a network side according to an embodiment of the present application.

On a network side, referring to FIG. 3, a resource allocation apparatus provided by the embodiments of the present application includes:
a memory 520, configured to store a program instruction; and
a processor 500, configured to call the program instruction stored in the memory, and execute, according to an obtained program:
allocating resources of a transmission configuration indication (TCI) state, and determining TCI state resource allocation information; and
notifying a terminal of the TCI state resource allocation information.

In one embodiment, the processor notifies the terminal of the TCI state resource allocation information in one of the following manners:
Manner 1: the terminal is notified of the TCI state resource allocation information through a bitmap; or
Manner 2: a starting resource block (RB) and a quantity of occupied RBs of the TCI state are notified; or
Manner 3: a correspondence relationship between the TCI state and a preset resource allocation pattern is notified.

In one embodiment, when the terminal is notified of the TCI state resource allocation information in the Manner 1, the processor 500 is configured to:
with a resource block group (RBG) as a unit, number the RBGs according to an RBG grid, and indicate the TCI state resource allocation information through the bitmap.

In one embodiment, the processor 500 is configured to:
notify resources corresponding to TCI states in downlink control information, and then notify a resources corresponding to one of the TCI states through the bitmap;
notify the resources corresponding to each of TCI states respectively in the downlink control information through the bitmap.

In one embodiment, when the terminal is notified of the TCI state resource allocation information in the Manner 2, the processor 500 is configured to:
notify resources corresponding to TCI states in downlink control information, and then notify a starting RB and a quantity of occupied RBs of one of the TCI states;
notify a starting RB and a quantity of occupied RBs corresponding to each of TCI states respectively in the downlink control information.

In one embodiment, when the Manner 3 is adopted, the pattern includes one of the following:
   odd-numbered RBGs or RBs are a group of resources, and even-numbered RBGs or RBs are another group of resources; or
   at least first one RBG or RB is a group of resources, and the other RBGs or RBs are another group of resources; or
   a bitmap of at least one RBG or RB.

A transceiver 510, is configured to receive and transmit data under control of the processor 500.

In FIG. 3, a bus architecture may include any number of buses and bridges interconnected specifically by various circuits of one or more processors represented by the processor 500 and memories represented by the memory 520. The bus architecture may also link various other circuits of peripheral devices, voltage regulators, power management circuits, etc., which are all known in the art, and therefore, no further description will be given herein. A bus interface provides an interface. The transceiver 510 may be elements, namely, including a transmitter and a receiver, and provides a device for communicating with various other devices on a transmission medium. The processor 500 is responsible for managing the bus architecture and general processing, and the memory 520 may store data used by the processor 500 when performing operations.

The processor 500 may be a central processing unit (CPU), an application specific integrated circuit (ASIC), a field-programmable gate array (FPGA), or a complex programmable logic device (CPLD).

Figure 4:
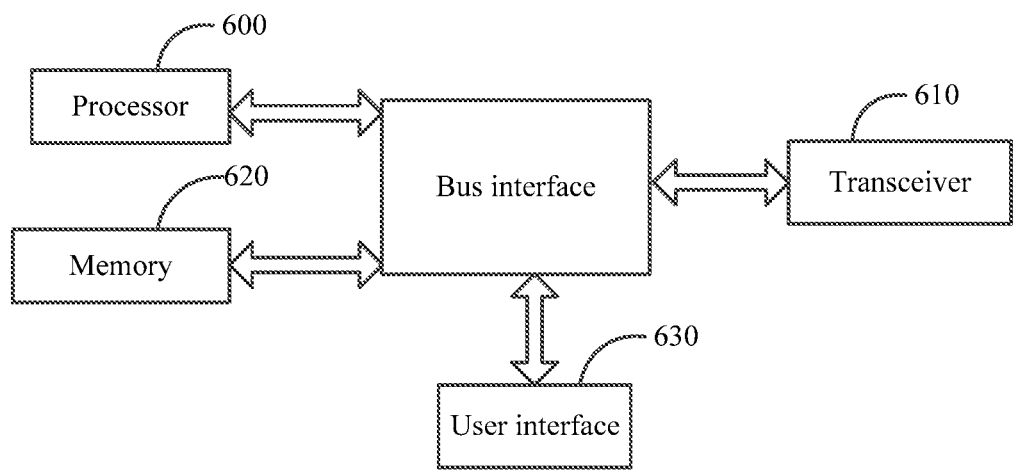
FIG. 4 is a schematic structural diagram of a resource determination apparatus on a terminal side according to an embodiment of the present application.

On a terminal side, referring to FIG. 4, a resource determination apparatus provided by an embodiment of the present application includes:
   a memory 620, configured to store a program instruction; and
   a processor 600, configured to call the program instruction stored in the memory, and execute, according to an obtained program:
   determining resources of a transmission configuration indication (TCI) state according to TCI state resource allocation information notified by a network side; and
   determining a size of a pre-coded resource block group (PRG) according to the resources of TCI state.

In one embodiment, the processor 600 determines the size of the PRG in the following manners:
   when downlink control information sent by the network side indicates that a value of the size of the PRG is taken from set 1, and the set 1 is {2, a continuously scheduled bandwidth} or {4, the continuously scheduled bandwidth}:
   for any TCI state: if resources corresponding to the any TCI state are continuous and greater than or equal to BWP/4, or, resources corresponding to the any TCI state are continuous, and a sum of sizes of resources corresponding to TCI states exceeds BWP/2, the size of the PRG is a size of the resources corresponding to the any TCI state, BWP is a preset part of a bandwidth;
   otherwise, the size of the PRG is a value other than "the continuously scheduled bandwidth" in the set 1.

In one embodiment, a precoding manner in the resources with the size of the PRG is kept unchanged.

A transceiver 610, is configured to receiving and transmitting data under control of the processor 600.

In FIG. 4, a bus architecture may include any number of buses and bridges interconnected specifically by various circuits of one or more processors represented by the processor 600 and memories represented by the memory 620. The bus architecture may also link various other circuits of peripheral devices, voltage regulators, power management circuits, etc., which are all known in the art, and therefore, no further description will be given herein. A bus interface provides an interface. The transceiver 610 may be elements, namely, including a transmitter and a receiver, and provides a device for communicating with various other devices on a transmission medium. For different user equipment, a user interface 630 may further be an interface to connect externally and internally with required equipment. The connected equipment includes but not limited to a keypad, a display, a speaker, a microphone, a joystick, and the like.

The processor 600 is responsible for managing the bus architecture and general processing, and the memory 620 may store data used by the processor 600 when performing operations.

In one embodiment, the processor 600 may be a central processing unit (CPU), an application specific integrated circuit (ASIC), a field-programmable gate array (FPGA), or a complex programmable logic device (CPLD).

Figure 5:
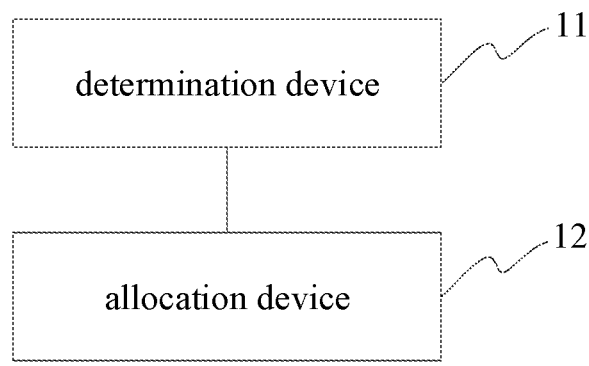
FIG. 5 is a schematic structural diagram of another resource allocation apparatus on a network side according to an embodiment of the present application.

On the network side, referring to FIG. 5, another resource allocation apparatus provided by the embodiments of the present application includes:
   a determination device 11, configured to allocate resources of a transmission configuration indication (TCI) state and determine TCI state resource allocation information; and
   an allocation device 12, configured to notify a terminal of the TCI state resource allocation information.

In one embodiment, the allocation device 12 notifies the terminal of the TCI state resource allocation information in one of the following manners:
   Manner 1: the terminal is notified of the TCI state resource allocation information through a bitmap; or
   Manner 2: a starting resource block RB and a quantity of occupied RBs of the TCI state are is notified; or
   Manner 3: a correspondence relationship between the TCI state and a preset resource allocation pattern is notified.

In one embodiment, when the terminal is notified of the TCI state resource allocation information in the Manner 1, the allocation device 12 is configured to:
   with a resource block group (RBG) as a unit, number the RBGs according to an RBG grid, and indicate the TCI state resource allocation information through the bitmap.

In one embodiment, the allocation device 12 is configured to:
   notify resources corresponding to TCI states in downlink control information, and then notify resources corresponding to one of the TCI states through the bitmap;
   notify the resources corresponding to each of TCI states respectively in the downlink control information through the bitmap.

In one embodiment, when the terminal is notified of the TCI state resource allocation information in the Manner 2, the allocation device 12 is configured to:
   notify resources corresponding to TCI states in downlink control information, and then notify a starting RB and a quantity of occupied RBs of one of the TCI states;
   notify a starting RB and a quantity of occupied RBs corresponding to each of TCI states respectively in the downlink control information.

In one embodiment, when the Manner 3 is adopted, the preset resource allocation pattern includes one of the following:

odd-numbered RBGs or RBs are a group of resources, and even-numbered RBGs or RBs are another group of resources; or at least first one RBG or RB is a group of resources, and the other RBGs or RBs are another group of resources; or a bitmap of at least one RBG or RB.

Figure 6:
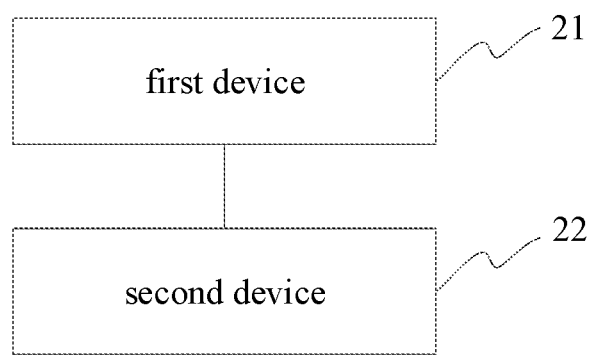
FIG. 6 is a schematic structural diagram of another resource determination apparatus on a terminal side according to an embodiment of the present application.

On a terminal side, referring to FIG. 6, another resource determination apparatus provided by the embodiments of the present application includes:

a first device 21, configured to determine resources of a transmission configuration indication (TCI) state according to TCI state resource allocation information notified by a network side; and a second device 22, configured to determine a size of a pre-coded resource block group (PRG) according to the resources of TCI state.

In one embodiment, the second device 22 determines the size of the PRG in the following manners:

when downlink control information sent by the network side indicates that a value of the size of the PRG is taken from set 1, and the set 1 is {2, a continuously scheduled bandwidth} or {4, the continuously scheduled bandwidth}:

for any TCI state: if resources corresponding to the any TCI state are continuous and greater than or equal to BWP/4, or, resources corresponding to the any TCI state are continuous, and a sum of sizes of resources corresponding to TCI states exceeds BWP/2, the size of the PRG is a size of the resource corresponding to the TCI state, BWP is a preset part of a bandwidth;

otherwise, the size of the PRG is a value other than "the continuously scheduled bandwidth" in set 1.

In one embodiment, a precoding manner in the resources with the size of the PRG is kept unchanged.

It should be noted that division of devices in the embodiments of the present application is illustrative, and is only logical function division, and there may be other division manners in actual implementation. In addition, functional devices in each embodiment of the present application may be integrated into one processing device, or each device may exist alone physically, or two or more devices may be integrated into one device. The above integrated device may be implemented in the form of hardware or a software functional device.

If the integrated device is implemented in the form of the software functional device and sold or used as an independent product, it may be stored in a computer readable storage medium. Based on this understanding, the embodiments of the present application essentially or the part that contributes to the prior art or all or part of the embodiments may be embodied in the form of a software product, and the computer software product is stored in a storage medium, including instructions to make a computer device (which may be a personal computer, a server, a network device, etc.) or a processor execute all or part of the methods described in the embodiments of the present application. The aforementioned storage medium includes: a USB flash drive, a mobile hard disk drive, read-only memory (ROM), a random access memory (RAM), a diskette, a compact disc or other media that may store program codes.

The embodiments of the present application provide a computing device. The computing device may specifically be a desktop computer, a portable computer, a smart phone, a tablet computer, a personal digital assistant (PDA), etc. The computing device may include a central processing unit (CPU), a memory, an input/output device, etc. The input device may include a keyboard, a mouse, a touch screen, etc. The output device may include a display device, such as a liquid crystal display (LCD), a cathode ray tube (CRT), etc.

The memory may include a read-only memory (ROM) and a random access memory (RAM), and provides a processor with program instructions and data stored in the memory. In the embodiments of the present application, the memory may be configured to store a program of any one of the resource allocation method or the resource determination method provided by the embodiments of the present application.

The processor calls the program instructions stored in the memory, and the processor is configured to execute any one of the resource allocation method or the resource determination method provided by the embodiments of the present application according to the obtained program instructions.

The embodiments of the present application provide a computer storage medium configured to store computer program instructions used by the apparatuses provided in the embodiments of the present application. The computer storage medium includes programs configured to execute any one of the resource allocation method or the resource determination method provided by the embodiments of the present application.

The computer storage medium may be any available medium or data storage device that the computer may access, including but not limited to a magnetic memory (such as a floppy disk, a hard disk, a magnetic tape, a magneto-optical (MO) disk, etc.), an optical memory (such as a CD, a DVD, a BD and an HVD), a semiconductor memory (such as a ROM, an EPROM, an EEPROM, a non-volatile memory (NAND FLASH), a solid state drive (SSD)), etc.

The methods provided by the embodiments of the present application may be applied to a terminal device, and may also be applied to a network device.

The terminal device may also be referred to as user equipment (UE), a mobile station (MS), a mobile terminal, etc. In one embodiment, the terminal may have the capacity of communicating with one or more core networks via a radio access network (RAN). For example, the terminal may be a mobile phone (or referred to as a "cellular" phone), or a computer with a mobile property, or the like. For example, the terminal may also be a portable, pocket, handheld, computer built-in or vehicle-mounted mobile device.

The network device may be a base station (for example, an access point), and refers to equipment that communicates with a wireless terminal through one or more sectors on an air interface in an access network. The base station may be configured to convert a received air frame and (IP) packets to each other as a router between the wireless terminal and the rest of the access network, the rest of the access network may include an Internet protocol (IP) network. The base station may also coordinate the attribute management of the air interface. For example, the base station may be a base station (BTS, base transceiver station) in GSM or CDMA, or a base station (NodeB) in WCDMA, or an evolved base station (NodeB or eNB or e-NodeB, evolutional Node B) in LTE, or gNB in the 5G system, etc., which is not limited in the embodiments of the present application.

The processing flow of the methods may be implemented by a software program. The software program may be stored in the storage medium, and when the stored software program is called, the methods are executed.

In summary, the embodiments of the present application use bundling to improve channel estimation performance during coordinated multipoint transmission, specifically including: the method of determining the resources corresponding to each TCI state in the resource allocation process; and the process of determining the specific PRG size, especially the method of determining the PRG size when the downlink control information indicates that the value of the size of the PRG is from set 1 and set 1 is {2, the continuously scheduled bandwidth} or {4, the continuously scheduled bandwidth}. In the embodiments of the present application, in multi-TRP/panel-based URLLC enhanced transmission, if the FDM manner is used, the resources corresponding to each TCI state may be determined based on the above method. Moreover, PRB bundling may be performed using the size of the PRG equal to 2 or 4 or the continuous resources corresponding to each TCI state.

The embodiments of the present application can be provided as a method, a system, or a computer program product. Therefore, the present application may adopt the form of a complete hardware embodiment, a complete software embodiment, or an embodiment combining software and hardware. Moreover, the present application may adopt the form of a computer program product implemented on one or more computer-usable storage media (including but not limited to a disk memory, an optical memory, etc.) containing computer-usable program codes.

The present application is described according to the methods, devices (systems), and flowcharts and/or block diagrams of computer program products of embodiments of the present application. It should be understood that each process and/or block in the flowcharts and/or block diagrams, and the combination of processes and/or blocks in the flowcharts and/or block diagrams may be realized by computer program instructions. These computer program instructions may be provided to a processor of a general-purpose computer, a special-purpose computer, an embedded processor, or other programmable data processing equipment to generate a machine, so the instructions executed by the processor of the computer or other programmable data processing equipment generate an apparatus configured to realize functions specified in one process or processes in the flowcharts and/or one block or blocks in the block diagrams.

These computer program instructions may also be stored in a computer-readable memory that may direct the computer or other programmable data processing equipment to work in a specific manner, so the instructions stored in the computer-readable memory produce an article of manufacture including an instruction apparatus. The instruction apparatus realizes the functions specified in one process or processes in the flowcharts and/or one block or blocks in the block diagrams.

These computer program instructions may also be loaded on the computer or other programmable data processing equipment, so a series of operation methods are executed on the computer or other programmable equipment to produce computer-implemented processing. Thus, the instructions executed on the computer or other programmable equipment provide methods configured to realize the functions specified in one process or processes in the flowcharts and/or one block or blocks in the block diagrams.

What is claimed is:

1. A resource allocation method, comprising:
allocating resources of a transmission configuration indication (TCI) state and determining TCI state resource allocation information; and
notifying a terminal of the TCI state resource allocation information by notifying a correspondence relationship between the TCI state and a preset resource allocation pattern;
wherein the preset resource allocation pattern comprises: at least first one RBG or RB being a group of resources, and the other RBGs or RBs being another group of resources.

2. A resource determination method, comprising:
determining resources of a transmission configuration indication (TCI) state according to TCI state resource allocation information notified by a network side; wherein the TCI state resource allocation information is notified by the network side by notifying a correspondence relationship between the TCI state and a preset resource allocation pattern, and the preset resource allocation pattern comprises: at least first one RBG or RB being a group of resources, and the other RBGs or RBs being another group of resources; and
determining a size of a precoded resource block group (PRG) according to the resources of the TCI state.

3. The method according to claim 2, wherein the size of the PRG is determined in the following manner:
when downlink control information sent by the network side indicates that a value of the size of the PRG is taken from set 1, and the set 1 is {2, a continuously scheduled bandwidth} or {4, the continuously scheduled bandwidth}:
for any TCI state:
if resources corresponding to the any TCI state are continuous and greater than or equal to BWP/4, or, resources corresponding to the any TCI state are continuous, and a sum of sizes of resources corresponding to a plurality of TCI states exceeds BWP/2, the size of the PRG is a size of the resources corresponding to the any TCI state, wherein BWP is a preset part of a bandwidth;
otherwise, the size of the PRG is a value other than "the continuously scheduled bandwidth" in the set 1.

4. The method according to claim 2, wherein a precoding manner in resources with the size of the PRG is kept unchanged.

5. A resource allocation apparatus, comprising:
a memory, configured to store a program instruction; and
a processor, configured to call the program instruction stored in the memory, and execute, according to an obtained program:
allocating resource of a transmission configuration indication (TCI) state, and determining TCI state resource allocation information; and
notifying a terminal of the TCI state resource allocation information by notifying a correspondence relationship between the TCI state and a preset resource allocation pattern;
wherein the preset resource allocation pattern comprises: at least first one RBG or RB being a group of resources, and the other RBGs or RBs being another group of resources.

6. A resource determination apparatus, comprising:
a memory, configured to store a program instruction; and
a processor, configured to call the program instruction stored in the memory, and execute the method of claim 2.

7. The apparatus according to claim 6, wherein the processor determines the size of the PRG in the following manners:

when downlink control information sent by the network side indicates that a value of the size of the PRG is taken from set 1, and the set 1 is {2, a continuously scheduled bandwidth} or {4, the continuously scheduled bandwidth}:

for any TCI state:

if resources corresponding to the any TCI state are continuous and greater than or equal to BWP/4, or, resources corresponding to the any TCI state are continuous, and a sum of sizes of resources corresponding to a plurality of TCI states exceeds BWP/2, the size of the PRG is a size of the resources corresponding to the any TCI state, wherein BWP is a preset part of a bandwidth;

otherwise, the size of the PRG is a value other than "the continuously scheduled bandwidth" in the set 1.

8. The apparatus according to claim 6, wherein a precoding manner in the resources with the size of the PRG is kept unchanged.

9. A non-transitory computer storage medium, storing a computer-executable instruction, wherein the computer-executable instruction is configured to make a computer execute the method according to claim 1.

10. A non-transitory computer storage medium, storing a computer-executable instruction, wherein the computer-executable instruction is configured to make a computer execute the method according to claim 2.

* * * * *